US012808349B2

(12) United States Patent
Shrive et al.

(10) Patent No.: US 12,808,349 B2
(45) Date of Patent: Nov. 24, 2026

(54) BEARING ARRANGEMENT FOR RADIAL PISTON UNITS

(71) Applicant: Danfoss Power Solutions (Jiangsu) Co., Ltd., Zhenjiang (CN)

(72) Inventors: Chris Shrive, Edinburgh (GB); Xiaoyuan Chen, Zhenjiang (CN); Yanjiang Wan, Zhenjiang (CN)

(73) Assignee: DANFOSS A/S, Nordborg (DK)

( * ) Notice: Subject to any disclaimer, the term of this patent is extended or adjusted under 35 U.S.C. 154(b) by 231 days.

(21) Appl. No.: 18/580,453

(22) PCT Filed: Dec. 16, 2021

(86) PCT No.: PCT/IB2021/022243
§ 371 (c)(1),
(2) Date: Jan. 18, 2024

(87) PCT Pub. No.: WO2023/111622
PCT Pub. Date: Jun. 22, 2023

(65) Prior Publication Data

US 2024/0309839 A1 Sep. 19, 2024
US 2025/0092854 A9 Mar. 20, 2025

(51) Int. Cl.
*F03C 1/04* (2006.01)
*F03C 1/047* (2006.01)
(Continued)

(52) U.S. Cl.
CPC ............ *F03C 1/0403* (2013.01); *F03C 1/047* (2013.01); *F04B 1/0404* (2013.01); (Continued)

(58) Field of Classification Search
None
See application file for complete search history.

(56) References Cited

U.S. PATENT DOCUMENTS 4,589,328 A 5/1986 Irwin
4,953,524 A * 9/1990 Wusthof .............. F04B 1/0439 91/491
(Continued)

FOREIGN PATENT DOCUMENTS

CN 113123921 A 7/2021
CN 114635824 A 6/2022
(Continued)

OTHER PUBLICATIONS

Notice of the Reasons for Refusal and an English translation thereof for corresponding Japanese Patent Application No. 2024-503446, mailed Nov. 25, 2025 (12 pages total).
(Continued)

*Primary Examiner* — Essama Omgba
*Assistant Examiner* — Geoffrey S Lee
(74) *Attorney, Agent, or Firm* — McCormick, Paulding & Huber PLLC

(57) ABSTRACT

A hydrostatic radial piston unit of the cam-lobe type of construction having a non-rotary, stationary shaft defining a rotational axis of the hydrostatic radial piston unit. A non-rotary, stationary casing houses the shaft in a torque proof connection. A rotary casing is provided which is rotary around the rotational axis. A pair of roller bearings supports the rotary casing in a rotatable manner against the stationary casing, wherein the pair of roller bearings is arranged in an axial overlapping area in which the stationary casing and the rotary casing overlap.

24 Claims, 6 Drawing Sheets

(51) Int. Cl.

| | |
|---|---|
| ***F04B 1/0404*** | (2020.01) |
| ***F04B 1/0448*** | (2020.01) |
| ***F04B 1/047*** | (2020.01) |
| ***F04B 1/0476*** | (2020.01) |

(52) U.S. Cl.

CPC ............ *F04B 1/0448* (2013.01); *F04B 1/047* (2013.01); *F04B 1/0476* (2013.01)

(56) References Cited

U.S. PATENT DOCUMENTS

| | | | | | |
|---|---|---|---|---|---|
| 5,114,324 | A * | 5/1992 | Spindeldreher | F16D 55/40 | 418/61.3 |
| 5,115,890 | A * | 5/1992 | Noel | F16D 59/02 | 188/170 |
| 5,179,889 | A * | 1/1993 | Wusthof | F01B 13/061 | 417/462 |
| 5,435,135 | A * | 7/1995 | Lallier | F03C 1/045 | 60/483 |
| 5,697,765 | A * | 12/1997 | Grahl | F03C 1/0444 | 91/484 |
| 5,820,506 | A * | 10/1998 | Mann | B62D 55/13 | 475/83 |
| 6,248,037 | B1 * | 6/2001 | Forster | F03C 1/045 | 475/83 |
| 10,336,179 | B2 * | 7/2019 | Albert | B60T 1/065 | |
| 2018/0009312 | A1 | 1/2018 | Albert | | |
| 2020/0122526 | A1 | 4/2020 | Frey et al. | | |
| 2024/0044319 | A1 * | 2/2024 | Shrive | F04B 53/22 | |

FOREIGN PATENT DOCUMENTS

| | | | |
|---|---|---|---|
| CN | 217761217 | U | 11/2022 |
| CN | 116265737 | A | 6/2023 |
| EP | 3 460 229 | A1 | 3/2019 |
| GB | 927926 | A | 6/1963 |
| JP | H03-182687 | A | 8/1991 |
| JP | H10-89310 | A | 4/1998 |
| JP | H11-141450 | A | 5/1999 |
| WO | 2013/160145 | A2 | 10/2013 |

OTHER PUBLICATIONS

International Search Report mailed on Sep. 13, 2022, in connection with International Application No. PCT/IB2021/022243; 6 pages.

* cited by examiner

BEARING ARRANGEMENT FOR RADIAL PISTON UNITS

CROSS-REFERENCE TO RELATED APPLICATION

This application is a National Stage application of International Patent Application No. PCT/IB2021/022243, filed on Dec. 16, 2021, which is hereby incorporated by reference in its entirety.

TECHNICAL FIELD

The present innovation relates to hydrostatic radial piston units, more particular to cam lobe or orbital motors or pumps. In detail the present invention relates to a bearing arrangement for hydrostatic radial piston units of the cam-lobe type of construction.

BACKGROUND

Radial piston units, i.e. radial piston pumps and radial piston motors, are widely used in the art, e.g. for heavy duty applications. For example, radial piston units are used in the field of construction, agricultural or forestry equipment. Radial piston units are characterized in that their working pistons are moving in radial direction with respect to a central longitudinal axis, when supplied with pressurized hydraulic fluid. In general, radial piston units are used in hydraulic applications which do not require high rotational speeds but high torque. Radial piston units show the advantage over axial piston units of a reduced axial construction space.

One specific application of radial piston units is propelling of work vehicles, e.g. of track loaders. Often, one radial piston unit is installed at either side of a frame/body of a work vehicle. Therefore, the geometry of the propel mechanism is influenced significantly by the dimensions of the radial piston units. The position, where the radial piston unit transmits torque to a drive means, is in many applications preset by other components than the radial piston unit that interact with the drive means. However, radial piston units in the known art show a relatively high length in the axial direction and a relatively high diameter. As radial piston units driving work vehicles have to be integrated into the vehicle frame, the frame has to be designed in a manner to be capable of receiving stationary parts, e.g. a stationary casing, of the radial piston unit in order to support the torque generated in operating conditions. It is therefore desirable to reduce the dimensions of the used radial piston units, especially in the axial direction, as much as possible, in order to reduce the adaption in the design of the frame, the radial piston unit is installed to.

WO 2013/160145 A2 discloses a radial piston engine with a rotary output shaft. In order to reduce the axial length of the radial piston engine, at least sections of a brake are arranged between a housing and a portion of the output shaft. The output shaft is designed rotary, e.g. for driving a wheel which can be fastened to an output flange at the output shaft.

GB 927 926 A discloses a motor having a stationary shaft and cylinder block mounted to the shaft having a plurality of cylinders and reciprocable pistons and a control face area. Each cylinder comprises a port communicating with said control face area. A housing is adapted to react to the pistons by means of a roller way.

From EP 3 460 229 A1 an internally curved low speed high-torque motor is known with torque being output by means of the rotation of a housing. The hydraulic motor is composed of a left bearing block, a right end cover, a spacer ring, a cylinder body, an internally curved cam ring, an axial oil distribution pan and a plurality of radially arranged plunger assemblies.

CN 113 123 921 A discloses a low speed torque hydraulic motor with a fixed cylinder assembly, a rotating motor housing assembly, a brake disc assembly and a speed sensor. The motor housing assembly surrounds the fixed cylinder assembly.

SUMMARY

It is an objective of the invention to provide a radial piston unit with reduced dimensions, especially reduced axial length, but also reduced radial diameter. Simultaneously the provided radial piston unit shall be easy to assemble and shall comprise a cost efficient and robust design.

The objective is solved by a hydrostatic radial piston unit according to claim 1. Preferred embodiments are presented in the dependent claims.

A hydrostatic radial piston unit according to the invention comprises a stationary shaft. The stationary shaft defines a longitudinal axis, which is also the rotational axis of the hydrostatic radial piston unit. In the present description, the terms "radial" and "axial" refer to directions relative to the longitudinal axis of the stationary shaft. In the scope of this application, "stationary" means non-rotary around the longitudinal axis, when the radial piston unit is installed to a work vehicle, e.g.

A stationary casing houses the stationary shaft at a rear end portion in a torque-proof manner. This means that neither the stationary shaft nor the stationary casing rotate relative to each other. Hence, the stationary casing is provided to be coupled to a frame of the work vehicle, e.g. In the meaning of the present description, the stationary parts of the radial piston unit according to the invention form the rear end area which can be fastened stationary to a frame or support, e.g.

At a front end portion of the stationary shaft protruding from the stationary casing a cylinder block is arranged stationary in torque-proof connection with the stationary shaft. A rotary casing surrounds the cylinder block at the protruding front end of the stationary shaft. Thereby the rear end portion of the rotary casing is sealed against the front end portion of the stationary casing, as the rotary casing is capable of rotating relative to the stationary casing around the rotational axis of the radial piston unit. The sealing between the rotary casing and the stationary casing is executed in such a manner that both casings form a closed fluid-tight cavity.

Substantially, the axial position of the seal between the stationary casing and the rotary casing defines a sealing plane which is orthogonal to the rotary axis. In consequence in a view from the outside, the sealing plane divides the casing of the hydrostatic radial piston unit in a stationary part on one side of the sealing plane (the rear end part) and a rotary part (the front end part) on the other side of the sealing plane.

The cylinder block comprises a plurality of cylinder bores which extend radially inward from a circumferential surface of the cylinder block. A plurality of working pistons is arranged in a radially movable manner in the cylinder bores, wherein each cylinder bore accommodates one working piston. Each working piston seals a pressure chamber in the cylinder bore which can be supplied via a hydraulic channel with pressurized hydraulic fluid in order to generate a force on the head of the working piston which causes the working piston to move radially outwards. Via the hydraulic channel hydraulic fluid can be drained also from the cylinder bore in case the working piston is forced mechanically inwards.

The rotary casing comprises an internal cam-lobe surface. When pressurized fluid is supplied to the pressure chambers, the working pistons are urged against the cam-lobe-surface. As the cylinder block is stationary, and supported by the stationary casing via the stationary shaft, the movement of the working pistons radially outwards generates a force on the cam-lobe surface which causes the rotary casing to rotate relative to the stationary casing.

In order to conduct pressurized fluid to the pressure chambers, a rotary distributor is provided comprising a hollow shaft part and a disc-shaped part which are preferably formed integrally with each other but may also be attached to each other, e.g. in a fluid tight manner. In a preferred embodiment, the disc-shaped part of the distributor shows radial elevations which fint into the lobes of the cam-lobe surface. The disc-shaped part is in torque proof connection with the rotary casing. The rotary distributor comprises timing holes in the disc-shaped part for supplying and draining via the hydraulic channels hydraulic fluid to and from the cylinder bores in the cylinder block. As a person skilled in the relevant art is familiar with the working principle of a radial piston unit, further detailing of the functioning of a radial piston unit at this point is not necessary.

A pair of roller bearings supports the rotary casing against the stationary casing. According to the invention, the roller bearings are arranged radially outside of the rotary distributor and axially substantially in the same position as the hollow shaft part of the distributor in the vicinity of the rear end portion of the rotary casing, respectively, in the vicinity of the front end portion of the stationary casing. In other words, the roller bearings enable a relative motion between the rotary casing and the stationary casing and are arranged nearby or close to the sealing plane in order to avoid large tilt moments of both casings, which facilitates sealing of both casings, too.

The roller bearings according to the invention are arranged as a pair and in one embodiment preferably next to or in a close proximity to each other. Arranged axially substantially in the same position as the hollow shaft part of the rotary distributor means, that the bearings are disposed in the axial area adjacent to the cylinder block side facing towards the stationary casing and surround at least partially the rotary distributor. In this area too, the stationary casing and the rotary casing overlap each other or at least extensions or protrusions of one or both casings overlap axially while being arranged coaxially in a manner that rotary parts, as the rotary casing or the rotary distributor e.g., can rotate relative to stationary parts, like the stationary casing or the stationary shaft, for instance. The pair of bearings may comprise a different axial length than the distributor. As the bearings are arranged radially (with respect to the longitudinal axis) outside of the hollow shaft part of the distributor and at least partially overlapping in axial direction with the distributor instead of axially next to it, the axial length of the hydrostatic radial piston unit is reduced. A person with relevant skills in the art will understand that the use of roller bearings is a preferred embodiment only. However it is also covered by the invention to use journal bearings in order to rotationally support the rotary casing against the stationary casing.

According to one preferred embodiment of the invention, the stationary casing of the radial piston unit can comprise a stationary extension extending beyond the sealing plane in axial direction into the volume of the rotary casing, and having a substantially cylindrical shape. The extension accommodates an inner shell of the bearings, for instance. As the pair of bearings is received in a space between the rotary casing and the rotary distributor, the extension provides, for instance, a stationary support for the bearing radially outside of the hollow shaft part of the rotary distributor. Therefore, the extension is disposed in the space radially between the two rotary parts, the rotary distributor and the rotary casing.

In one embodiment according to the invention, the extension could be formed integrally with the stationary casing. However, in another embodiment according to the invention, the extension is provided as an additional part and is attached to the stationary casing. The extension can for example be attached to the stationary casing by means of screwing, welding, bonding, press fitting, heat shrinking, clamping, crimping or plastic deformation. The connection between the stationary casing and the additional extension part has to be a torque-proof connection, such that supporting forces of the bearings can statically be transmitted via the extension to the stationary casing. This increases the possibilities for designing and assembling the radial piston unit according to the invention. Preferably, the extension comprises a hollow cylindrical, sleeve-like shape wherein its outer surface is adapted to accommodate the pair of bearings, preferably in O-arrangement. To support the bearings in an axial direction the extension might comprise fixation means for the bearings at its outer surface, e.g. a shoulder to support the bearings in axial direction, a groove for receiving a retaining ring and/or a thread on which a shaft nut can be screwed.

According to the invention, the pair of roller bearings can not only be positioned in substantially the same axial position or in the proximity of the distributor, but also in substantially the same axial position as a flange, a sprocket or a similar torque transmission device at an outer circumferential surface of the rotary casing. In a motor working mode, a rotary part, like a wheel or a sprocket, can be driven by the hydrostatic radial piston unit. In a pump working mode, a rotary part can drive the hydrostatic radial piston unit. The torque transmission device serves as an interface to which a rotary part, or a track or a chain can be fixed to. As the bearings are arranged basically in the same axial position as the torque transmission device, no or at least reduced tilting moments are generated with respect to the longitudinal axis by the rotary casing relative to the position of the pair of bearings. Therefore, the bearings can be designed smaller and with lower load factors. This leads to lower costs for the bearings and, further, to lower production costs of the hydrostatic radial piston unit. Simultaneously, the bearing arrangement according to the invention decreases the axial length of a radial piston unit and reduces the distance between the torque transmission point and a fixation means at the stationary casing, via which the radial piston unit can be installed to, e.g., the frame of a vehicle.

In another embodiment according to the invention, the hydrostatic radial piston unit comprises a stationary (non-rotary) two-speed, three-speed or multiple-speed-control valve. The control valve, e.g. in the two speed embodiment, is switchable between a first position and a second position. In a first position, e.g. all cylinder bores are used for generating torque on the rotary casing, i.e. the cylinder bores can be supplied with fluid under a high pressure, e.g.

working pressure. This means, that a cylinder bore is supplied with hydraulic fluid under a high pressure forcing the piston which is arranged in the cylinder bore to move radially outwards. When the piston is moving radially inwards because it follows the shape of a cam of the cam-lobe surface, the corresponding cylinder bore is connected to an outlet timing hole and the hydraulic fluid is drained from the cylinder bore. In a second position, e.g., only a portion of the cylinder bores shows the same working behavior as in the first position, i.e. only a portion of cylinder bores can be supplied via an inlet timing hole with fluid under high pressure. However, another portion of the cylinder bores is supplied with fluid at a reduced pressure, e.g. charge pressure, independently from the movement of the working pistons. Here, for instance, groups of cylinder bores can also be hydraulically short-circuited under reduced hydraulic pressure.

In other words, in the first position of the control valve, the working volume of the hydrostatic radial piston unit is the sum of all working volumes enclosed between the cylinder bores and their corresponding working cylinders. In the second position, only a part of the cylinder bores is supplied with fluid at high pressure. Therefore, only this part of the working pistons and the corresponding cylinder bores contribute to the working volume of the radial piston unit. The other working pistons are supplied with a reduced pressure sufficient to assure contact of the piston rollers with the cam-lobe-surface of the rotating casing. They do not contribute to the actual working volume of the radial piston unit as the corresponding pressure chamber is not supplied with hydraulic fluid under high pressure. In the short-circuited case, the hydraulic fluid volume necessary to move one piston outwards is displaced by another inwardly moving piston.

According to the invention, the radial piston unit can comprise a park brake mechanism with brake discs that are arranged radially between the stationary casing and the rotary casing in an axially overlapping area of both casings. The brake discs are fixed alternatively to the stationary casing and the rotary casing. The park brake mechanism comprises a blocking position in which the brake discs are pressed against each other and the rotary casing is fixed in relation to the stationary casing. According to one embodiment of the invention, the brake discs can be arranged in the axially overlapping area between the stationary casing and the rotary casing in axial proximity to the bearing arrangement, e.g. on the other side of the sealing plane.

The park brake mechanism can be pre-tensioned towards its blocking position by means of a disc spring providing a pre-tensioning force which acts in the axial direction on a brake piston, and being supported, e.g. by an endcap fixed to the rear end of the stationary casing.

The axial pre-tensioning force of the disc spring can be transmitted to the brake discs by means of a brake piston arranged adjacent to the disc-spring. Brake pins extend in an axial direction between the brake piston and the brake discs. In consequence, the brake piston transfers the pre-tensioning force of the disc spring to the brake pins which press the brake discs against each other.

Different options are available for switching the park brake into the open position. For a first option, the brake pin seals a chamber that is formed, e.g. in the stationary part of the casing at the rear end of the radial piston unit. The chamber can also be formed by multiple parts, e.g. by the shaft, by the stationary casing, the brake pins and by the brake piston.

In one possibility, the rear end of the brake pins is accommodated in a fluid tight manner in the brake piston. An additional sealing is provided between the front end of the brake pin and the stationary casing. Therefore, a pressure chamber is formed by the stationary casing in combination with the rear end front face of the stationary shaft, the brake pin guiding holes and the brake piston. If pressurized hydraulic fluid is supplied to the pressure chamber, a force on a releasing surface of the brake piston is generated in order to balance the pre-tensioning force of the disc spring and release the brake.

Preferably, the rear end of the brake pins which faces in the direction of the brake piston, comprises a higher diameter than the front end of the brake pins. If pressurized hydraulic fluid is supplied to the pressure chamber in order to generate a force on the releasing surface of the brake piston, the same pressure is applied to the end surfaces of the brake pin. Due to the higher diameter of the rear end of the brake pins, a higher force will be generated on this side. Therefore, the brake pins remain in contact with brake piston, even if the brake piston moves in the direction of the disc spring, i.e. in direction of the end cap of the stationary casing.

For the second option representing an alternative embodiment of the invention, a pressure chamber is formed inside of axially oriented bores in which the brake pins are arranged and guided in axial direction. Sealings are provided at the front and at the rear end of the brake pins to close the pressure chamber. Preferably, also in this embodiment, the rear end of the brake pins which faces in the direction of the brake piston, comprises a higher diameter than the front end of the brake pins. If pressure is supplied to the pressure chamber, a higher force will be generated at the rear end of the brake pins due to the higher diameter. Therefore, the brake pin moves in the direction of the rear end of the hydrostatic radial piston unit, i.e. in the direction of the brake piston. If there is a gap between the brake pin and the brake piston, the brake pin will move towards the rear side until it is in contact with the brake pin. Then, the force generated by the pressure in the pressure chamber is transmitted to the brake piston by means of the brake pin. If the generated force is high enough to overcome the pre-tensioning force of the disc-spring, the disc-spring is compressed and the park brake is released.

In one preferred embodiment, an end cover closes the stationary, non-rotary casing on a side opposite of the stationary casing to where the brake discs are arranged and supports the disc spring in axial direction. The disc spring generates an axially oriented force on the disc-shaped brake piston. Thereby the brake pins which, e.g., are arranged in axial bores in the stationary casing are moved towards the brake discs in order to press the brake discs against each other. The force of the disc spring might be adjustable, e.g. by adjusting the length of the brake pack, i.e. the number of brake disks and therewith moving the position of the brake piston relative to the end cover.

In one embodiment according to the invention, the non-rotary, stationary casing comprises annular grooves at an inner surface of a through hole, which form first circular conducts together with first grooves at an outer circumferential surface of the non-rotary shaft. According to the invention, brake pins are used to bridge the axial gap between the brake piston and the brake discs which can be arranged in the axial overlapping area. Preferably, the axially oriented bores with the brake pins are arranged radially outside of the first circular conducts in the stationary casing. This ensures that the outer surface of the shaft provides space for the annular grooves, and that the inner surface of the stationary casing can provide space for the first grooves.

A brake design according to the invention allows centrally arranged brake discs to be positioned close to the region where the rotating part of the hydrostatic radial piston unit overlaps with the stationary part. Simultaneously, the hydraulic connections required for providing hydraulic fluid to the pressure chamber of the brake arrangement in order to release the brake, can be arranged in the stationary part of the hydrostatic radial piston unit as well as mechanical parts of the park brake with the exception of the brake discs fixed to the rotating part. The brake pins provide a functional connection between the brake discs in the overlapping area/near the rotating part and the pressure chamber in the stationary part. Therefore, it is not necessary to feed hydraulic fluid with brake release pressure from the stationary part to the rotating part. In consequence, less sealed joints are required and the complexity of assembling and machining of the hydrostatic radial piston unit according to the invention is reduced. Additionally the quantity of potential leakage points is reduced.

In another preferred embodiment according to the invention, the cam lobe surface is integrally formed with the rotary casing. If the casing would be assembled of multiple parts, the necessary connections and seals would require additional radial and axial space. Integrally forming the rotary casing together with the cam-lobe-surface decreases the complexity of the assembling process. Additionally, this integral concept is capable of reducing the diameter, i.e. the radial dimension, of the hydrostatic radial piston unit, as connections between parts can be eliminated. This also saves manufacturing and assembly costs, as accurately machined connection surfaces and additional assembly steps are avoided.

A synchronizing pin can be accommodated in axially oriented holes in the rotary casing, preferably in prolongation of the lobes, and engaging with a corresponding hole in one of the radial elevations of the disc-shaped part of the distributor. Therewith, the synchronizing pin can simultaneously interact with the rotary casing and the rotary distributor. Thereby the synchronizing pin ensures, that the distributor is oriented correctly, when the distributor is installed in the rotary casing. Furthermore, the synchronizing pin synchronizes the rotation of the distributor with the rotation of the rotary casing, i.e. blocks a relative movement between these two parts.

According to the invention, the radial piston unit further comprises distributor springs to press the rotary distributor with its disc-shaped part towards the cylinder block. According to the invention, these distributor springs are received preferably in axially extending bores in the rotary casing in axial prolongation of the lobes. Preferably the disc-shaped part of the rotary distributor shows a contour complementary to the cam-lobe surface. The distributor springs urge the rotary distributor towards the cylinder block. Thereby a front surface of the disc-shaped part of the rotary distributor and the adjacent front surface of the cylinder block form a hydrostatic bearing between the disc-like portion of the rotary distributor and the stationary cylinder block.

The hydrostatic bearing is supplied with pressurized fluid by means of timing holes which are arranged in the front face of the disc-shaped part of the rotary distributor and via which hydraulic fluid can be supplied/drained to and from the cylinder bores in the cylinder block. Arranging the distributor springs in the rotary casing which is in torque proof connection with the distributor guarantees that there is no relative motion in a circumferential direction between the distributor springs and the distributor. If there would be a relative motion between the two components, the springs would likely be prone to intensive wear and/or would undergo buckling. Additionally, accommodating the distributor springs axially in prolongation/extension of the lobes of the cam-lobe surface reduces load and stress on the synchronizing pin resulting from frictional drag between the rotary distributor and the stationary shaft.

Another benefit is achieved when the springs are housed within the axial thickness of the distributor. This further reduces the axial length of the hydrostatic radial piston motor, as axially oriented bores in the front housing for accommodating the springs and pins are moved to the distributor and therewith the axial length of the front housing can be reduced.

In one embodiment according to the invention, the rotary distributor comprises second internal grooves forming second circular conducts together with second grooves at the outer surface of the non-rotary shaft. The second grooves at the outer surface of the non-rotary shaft are connected with the first circular conducts by means of channels in the shaft.

The first cylinder block may comprise more than one row of cylinder bores with radially reciprocating working pistons. Each row of cylinder bores is arranged axially spaced from the adjacent rows. The cylinder bores and the corresponding working pistons can be arranged in circumferential direction adjacent, i.e. with the same rotational orientation, or staggered to each other and can interact with the first cam-lobe surface.

According to the invention, the hydrostatic radial piston unit can comprise further a second cylinder block, whose working pistons interact with the same cam-lobe surface or with another one arranged in parallel to the first one. The second cylinder block is arranged axially parallel to the first cylinder block on the non-rotary shaft. Providing a cylinder block with more than one row of cylinder bores or a second cylinder block increases the potential working volume significantly, wherein the diameter of the hydrostatic radial piston unit stays the same.

In order to tailor the behavior of the hydrostatic radial piston unit to a specific application, the number of cylinder bores and the number of radially reciprocating working pistons of the axially spaced rows of cylinder bores or of the second cylinder block may differ from the number of cylinder bores and the number of radially reciprocating working pistons of the first cylinder block. In this case, a second circumferential cam lobe surface can be provided at the radially inner side of the rotary casing. The working pistons of the second cylinder block or of the second or a further row of cylinder bores can interact with the second cam lobe surface. In one embodiment, the second circumferential cam-lobe surface is formed integrally with the rotary casing.

In a further embodiment according to the invention, a reinforcing disc-shaped cover is attached to a front end of the rotary casing being also the front end of the hydrostatic radial piston unit. The cover closes and preferably seals the rotary casing, e.g. by means of an O-Ring, such that leakage of hydraulic fluid from the inside of the cavity formed by the rotary casing and the stationary casing is prevented. Additionally the front end and the reinforcing cover are designed such that the reinforcing cover is capable of absorbing radially oriented forces acting on the rotary casing due to the cam-lobe working principle.

In another embodiment, the reinforcing cover comprises a sleeve-like collar and the rotary casing comprises a complementary shoulder or vice versa. The sleeve-like collar can be arranged in a form closure connection with the complementary shoulder, at least in the radial direction. Thereby the rotary casing can be reinforced in the radial direction. Preferably, the thickness of the reinforcing cover is designed, such that the reinforcing cover comprises a low rotating mass, as it turns with the rotary casing, but provides a high radial stiffness. The higher radial stiffness of the reinforced rotary casing reduces possible deviations between the cam-lobe-surface and the working pistons interacting with the surface. The reinforcing cover therefore ensures a better contact between the cam-lobe-surface and the working pistons and thereby prevents increased wear of the components, as it is beneficial for the line contact of the piston rollers being pressed against the cam-lobe surface during operation of the radial piston unit.

In one preferred embodiment according to the invention the hydrostatic radial piston unit is operated as hydraulic motor. The hydraulic motor drives, for instance, a track drive or a wheel of a working machine, e.g. a track loader, by means of the torque transmission device. Especially in the field of track driving it is important, that the axial length of the radial piston unit is low, such that the design of the working machine can be chosen as flexible as possible.

BRIEF DESCRIPTION OF THE DRAWINGS

In the following annexed Figures, exemplary embodiments of the hydrostatic radial piston unit according to the invention as wells as specific subassemblies of a hydrostatic radial piston unit according to the invention are described. The presented embodiments do not limit the scope of the invention. The Figures show.

For illustration and legibility purposes only, in all presented Figures the same functional parts are indicated with same reference numbers.

DETAILED DESCRIPTION

Figure 1:
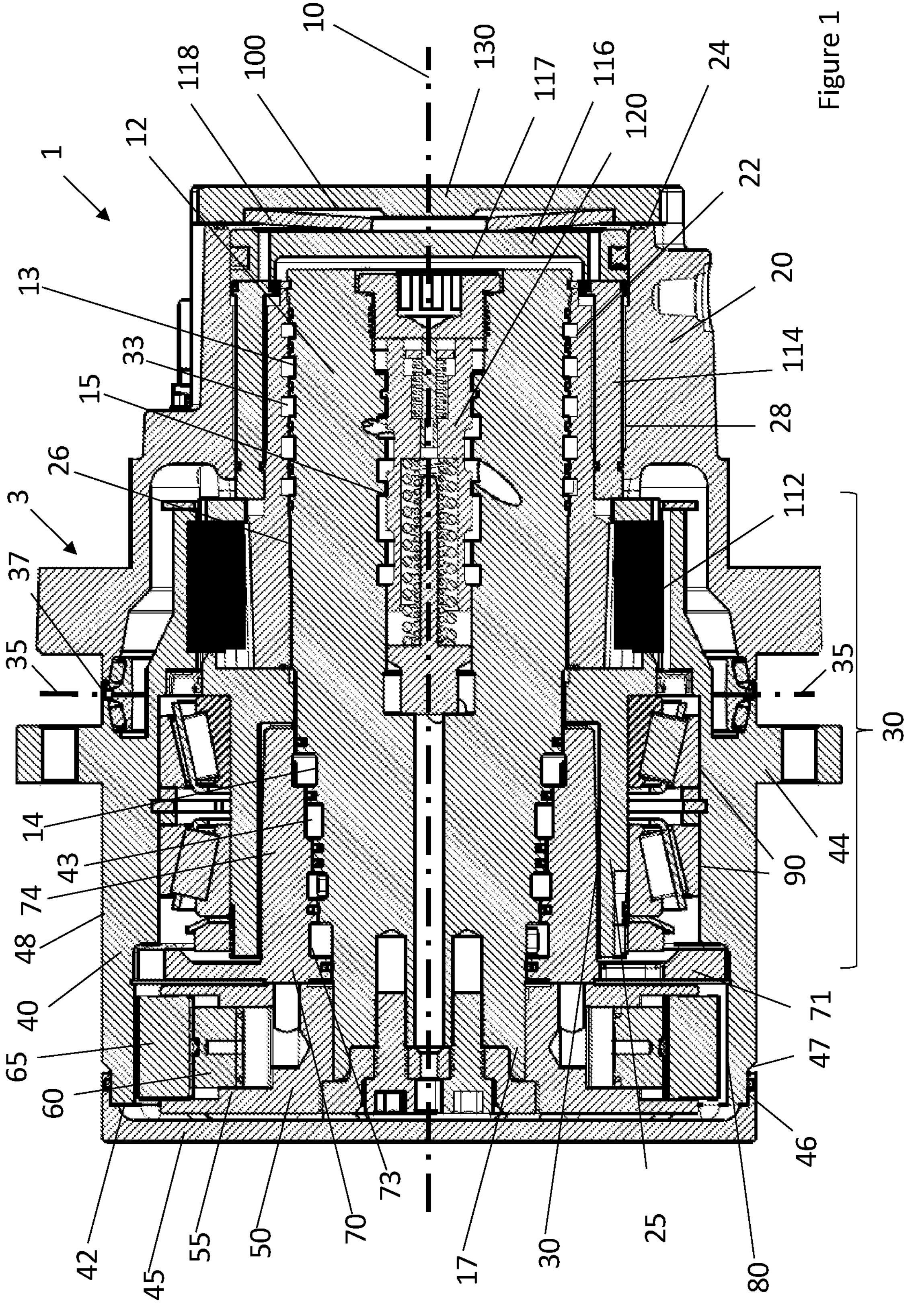
FIG. 1 shows a first sectional view along the rotational axis of a hydrostatic radial piston unit according to the invention.

FIG. 1 discloses a hydrostatic radial piston unit 1 according to the invention. The hydrostatic radial piston unit 1 comprises a stationary, non-rotary casing 20 comprising a through hole 26 which defines a rotational axis 10. The non-rotary casing 20 houses a stationary shaft 12 which is arranged coaxially with the rotational axis 10 and is in torque proof connection with the non-rotary casing 20. A rotary casing 40 is supported by means of a pair of roller bearings 90 such that it is rotatable around the rotational axis 10 in relation to the stationary casing 20. Thereby a rear end portion of the rotary casing 40 is sealed by means of a seal 37 against a front end portion of the stationary casing 20. The axial position of the seal 37 is defined by a sealing plane 35 which is orthogonal to the rotational axis 10. Seen from the outside, the sealing plane 35 splits the housing 3 of the radial piston unit 1 in a rotary casing part 40 on one side of the sealing plane 35 and a stationary casing part 20 on the other side of the sealing plane 35.

The pair of roller bearings 90 is arranged on an extension 25 of the stationary casing 20, wherein the extension 25 according to the embodiment shown in FIG. 1 is provided as an additional extension part. The extension 25 protrudes across the sealing plane 35 into the cavity which is formed by the rotary casing 40. In the embodiment shown with FIG. 1, the roller bearings 90 are arranged as a pair, i.e. substantially directly next to each other in the direction of the rotational axis and in O-configuration. O-configuration of the bearings is preferable, if the support spacing of the bearings shall be increased, e.g. if a component shall be guided with low tilting clearance or if high tilting forces must be supported. Otherwise, an X-configuration or a locating/non-locating bearing arrangement might be chosen.

According to the invention, the pair of bearings 90 are arranged in an axial overlapping area 30, in which the stationary, non-rotary casing part 20 and the rotary casing 40 overlap. In other words: In the overlapping area 30, the stationary casing 20 is arranged coaxially with the rotary casing 40 and vice versa. However, both, the stationary casing 20 and the rotary casing 40, are radially spaced from each other. This means, that the rotary casing 40 surrounds the stationary casing 20, as it is the case in the presented examples, or vice versa.

The rotary casing 40 comprises a torque transmission device 44, i.e. a flange at its outer circumferential surface 48. Depending on the application, a component can be attached to the flange 44, which can be driven by the hydrostatic radial piston unit 1 or which can drive the hydrostatic radial piston unit 1. The torque transmission device 44 is preferably arranged in the same axial position as the pair of bearings 90 in order to reduce the axial lever between the bearings 90 and the torque transmission device 44 and thereby eliminate tilting moments that would otherwise be generated.

Figure 3:
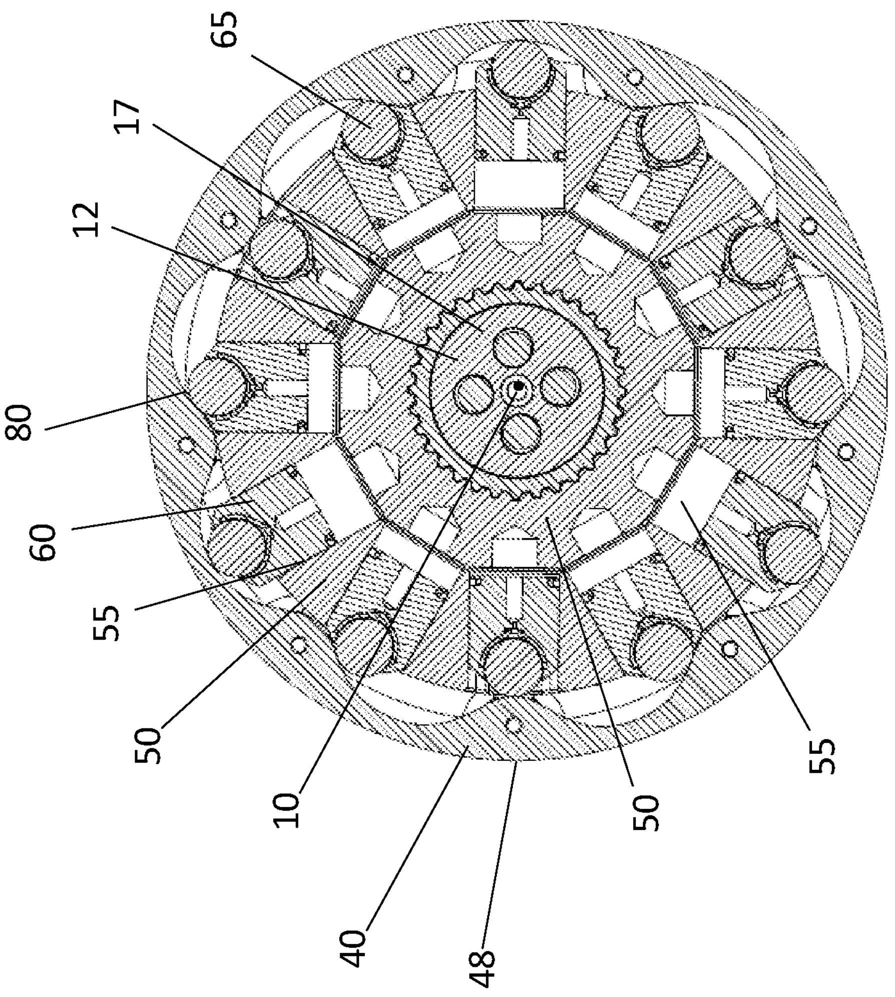
FIG. 3 shows a third sectional view of a hydrostatic radial piston unit according to the invention.

The rotary casing 40 comprises an inwardly oriented cam-lobe surface 80 against which working pistons 60 can be pressed (see also FIG. 3). In the presented embodiment, the cam-lobe surface 80 is formed integrally with the rotary casing 40, e.g. by 3D-milling, casting. turning, forging or a different manufacturing method. The working pistons 60 are housed in cylinder bores 55 of a cylinder block 50. The cylinder block 50 is designed to be stationary with the stationary shaft 12 and the stationary casing 20. Therefore, urging/pressing the working pistons 60 against the cam-lobe surface 80 causes a force on the cam-lobe surface 80 that is supported by the stationary cylinder block 50. Due to the shape of the cam-lobes, this force causes a rotation of the rotary casing 40.

In order to urge the working pistons 60 against the cam-lobe surface 80, pressurized fluid is supplied to the cylinder bores 55 of the cylinder block 50. If, in the opposite case, a working piston 60 is driven radially inwards due to following the shape of the cam-lobe surface, i.e. a cam, hydraulic fluid is drained from the corresponding cylinder bore 55. Therefore, the cylinder bores 55 have to be alternately connected to an inlet of the hydrostatic radial piston unit 1 and to an outlet of the hydrostatic radial piston unit 1. This is accomplished by a rotary distributor 70.

The rotary distributor 70 having a T-shaped cross section with a disc-shaped part 71 and a hollow shaft part 74 is partially arranged in the axial overlapping area 30. In consequence, the pair of bearings 90 can be arranged axially in the same position as the hollow shaft part 74 of the rotary distributor 70 and radially outside of the hollow shaft part 74 of the rotary distributor 70 in the area showing the lower diameter. However, in some designs the pair of bearings 90 might also be arranged radially inside of the hollow shaft part 74 of the rotary distributor 70.

Preferably, the rotary casing 40 and the stationary casing 20 seal an internal cavity. For this, in order to facilitate manufacturing and mounting capability of the parts of the radial piston unit 1 according to the invention, end covers 45, 130 are provided at the rear end side 24 as well as at the front end 42 of the radial piston unit 1. Additionally to its function for closing the casing cavity, the front cover 45 is designed to reinforce the rotary casing 40 and therewith the cam-lobe-surface 80 in the radial direction. The front cover 45 comprises a substantially flat disc-shaped base from which a hollow-cylindrical collar 46 extends. Complementary to the collar 46, a step 47 is provided in the outer circumferential surface 48 of the rotary casing 40. After the front cover 45 is attached to the rotary casing 40, the collar 46 provides support to the step 47 in the radial direction. This additional support guarantees that the cam-lobe surface 80 maintains its shape, even if the working pistons 55 are pressed against the cam-lobe surface 80. The thickness of the collar 46 and of the base plate can be chosen depending on the required stability increase.

Additionally the front cover 45 can comprise a lightweight construction, e.g. by means of reinforcing ribs in the mainly stressed areas and cutouts/recesses in the lower stressed areas. A person with relevant skills in the art will appreciate that the functional principle of a collar 46 providing front cover 45 and a step providing casing 40 might be inverted, such that the front cover 45 can comprise a step 47 and the casing 40 might comprise a collar 46. However, other stability increasing designs which are capable of absorbing forces acting on the rotary casing 40 in the radial direction are also covered by the scope of the invention, e.g. providing a dowelled joint between a substantially flat front cover 45 and the rotary front casing 40.

Additionally to its function for closing the rear end side 24 of the cavity of the two part casing of the radial piston unit 1, the end cover 130 is part of a park brake mechanism 100 whose actuation mechanism is arranged in the stationary casing 20. The park brake mechanism 100 comprises at least two brake discs 112 of which one is attached in a torque proof manner to the rotary casing 40 and the other one is attached non-rotational to the stationary casing 20. The brake discs 112 are movable in the axial direction relative to the stationary casing 20 and the rotary casing 40. If the park brake mechanism 100 comprises more than two brake discs 112, the discs 112 are connected to the stationary casing 20 and the rotary casing 40 in alternating order. A disc spring 118 supported by the end cover 130 provides a pre-tensioning force on a brake piston 116. As long as the brake piston 116 is not pressurized at its releasing surface 117, the spring force is transferred via the brake piston 116 to at least one brake pin 114 arranged in an axially oriented bore 28 in the stationary casing 20.

Preferably, to provide a more balanced actuation of the brake discs, more than one brake pin 114 is provided. The brake pins 114 are each arranged in one of circumferentially distributed axial bores 28. The at least one brake pin 114 applies/transfers the pre-tensioning force of the disc spring 118 on the brake discs 112 which are pressed against each other and supported by a shoulder of the stationary casing 20 or the extension 25, e.g. Therewith relative movement between the rotary casing 40 and the stationary casing 20 can be impeded at standstill of a working vehicle, e.g.

If relative movement between the rotary casing 40 and the stationary casing 20 shall be admitted, hydraulic pressure is applied to a releasing surface 117 of the brake piston 116 located opposite to the disc spring 118. The hydraulic pressure generates a force on the releasing surface 117 which is directed towards the rear side of the stationary casing 20, i.e. in the direction of the disc spring 118. As the generated force is directed opposite to the pre-tensioning force of the disc spring 118, the brake pins 114 are released from the brake discs 112. Thus, relative movement between the brake discs 112 and therewith relative movement of the stationary casing 20 and the rotary casing 40 is possible.

Preferably, the brake pins 114 comprise a specific geometry. The end of the brake pin 114 facing in the direction of the brake piston 116 comprises a higher diameter than the end facing in the direction of the brake discs 112. Additionally, the brake pins 114 are sealed against the stationary casing 20 and the stationary shaft 12. Therefore, a pressure chamber is formed between the end surfaces of the brake pins 114 and the casing 20 of the hydrostatic radial piston unit 1. If the brake piston 116 is urged in the direction of the brake discs 112, it pushes the brake pin 114 against the brake discs 112. If, in the other case, pressure is supplied to the sealed pressure chamber and a force is generated on the end surfaces of the brake pins 114. Due to the different diameters of the end surfaces, the pressure generates a force which urges the brake pin 114 in the direction of the brake piston 116. After the brake pin 114 is in contact with the brake piston 116, it presses the brake piston 116 against the disc spring 118 and thereby releases the axial force from the brake discs 112.

However it is also covered by the concept according to the invention that the specific design of the brake pins 114 ensures that the pins 114 are always in contact with the brake piston 116 independently whether the releasing surface is pressurized or not. In this embodiment, the brake pins 114 are sealed against the stationary casing 20 on the end facing away from the brake pistons 116. The rear end of the brake pins 114 with higher diameter is accommodated in the brake piston 116 and a seal is provided between the rear end of the brake pins 114 and the brake piston 116. Then, when the brake piston 116 is moved by the force generated by hydraulic pressure in a pressure chamber, which is formed by the brake piston 116 together with the shaft 12, the front ends of the brake pins 114 and the stationary casing 20, hydraulic pressure can be present at the rear/end surfaces of the brake pins 114. Due to the higher diameter of the end surface facing towards the brake piston 116, a higher force is generated by the hydraulic pressure on the side facing away from the brake piston 116 and the brake pin 114 is held in contact with the brake piston 116.

Figure 2:
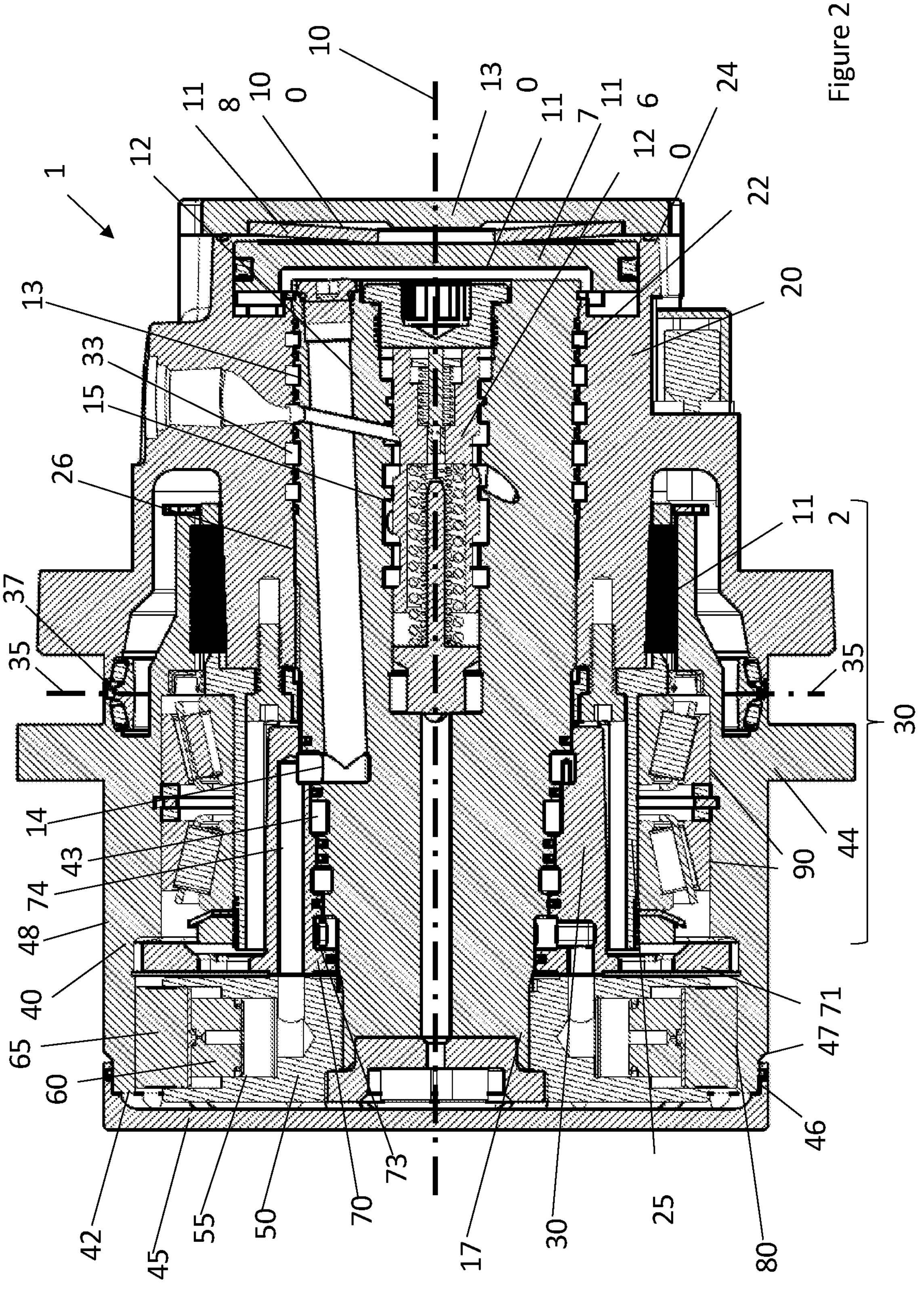
FIG. 2 shows a second sectional view along the rotational axis of a hydrostatic radial piston unit according to the invention.

FIG. 2 shows a sectional view of the hydrostatic radial piston unit 1 according to FIG. 1 in a different section plane. In the view according to FIG. 2, some of the plurality of hydraulic conducts of the hydrostatic radial piston unit 1 according to the invention are shown. In the center of the hydrostatic radial piston unit 1 a stationary, non-rotary shaft 12 is provided comprising first group of grooves 13 in a region towards the end side 24 of the hydrostatic radial piston unit 1 according to the invention. The stationary shaft 12 additionally comprises a second group of grooves 14 in an area towards the front end 42 of the hydrostatic radial piston unit 1. The first group of grooves 13 form first circular conducts 33 together with annular grooves 22 provided in the stationary, non-rotary casing. These first circular conducts 33 are used to distribute hydraulic fluid conducted from the inlet of the hydrostatic radial piston unit 1 and towards the outlet of the hydrostatic radial piston unit 1.

Second circular conducts 43 are formed by the second grooves 14 in combination with second internal grooves 73 in the hollow shaft part 74 of the rotary distributor 70. The first circular conducts 33 are fluidly connected with the second circular conducts 43 by means of channels (not visible in FIG. 2) arranged in the stationary shaft 12.

From the FIGS. 1 and 2, the internal structure of the rotary distributor 70 becomes apparent. The rotary distributor 70 is capable of selectively connecting the second circular conducts 43 with the appropriate cylinder bores 55, depending on whether via the timing holes high pressure shall be supplied to a specific cylinder bore 55 or whether hydraulic fluid shall be drained from the specific cylinder bore 55.

In the shown embodiment of the invention, the extension 25 is provided as additional part which is attached to the stationary casing 20. In addition to supporting the pair of bearings 90, the extension 25 provides a shoulder against which the brake discs 112 can be pressed. Both functionalities require tight manufacturing tolerances in order to guarantee a reliable bearing and braking of the hydrostatic radial piston unit 1. Realizing both of these functionalities on a relatively small additional part comprises the advantage that only the relatively small additional part has to be machined, whereas big parts of the stationary casing 20 do not require such a complicated machining in this regard as it would do, if the stationary casing 20 should provide the shoulder and/or the bearing surface.

The stationary, non-rotary shaft 12 further comprises an axial bore 15 which, in the presented example, is arranged coaxially with the rotational axis 10. A two-speed valve 120 is arranged in the axial bore 15. The two-speed valve 120 comprises two positions. In a first position, all cylinder bores 55 can be supplied with hydraulic fluid at a high pressure. In a second position only a part of the cylinder bores 55 can be supplied with hydraulic fluid at high pressure. The other cylinder bores 55 are supplied with a lower pressure, sufficient to force the rollers of the working piston 60 to follow the cam-lobe surface. Simultaneously the cylinder bores 55 supplied with the lower pressure can be hydraulically short-circuited. Therefore, in the first position, all cylinder bores 55 constitute the working volume of the hydrostatic radial piston unit 1. In the second position, the short-circuited cylinder bores 55 do not contribute to the working volume of the hydrostatic radial piston unit 1, as for every working piston 60 moving to the outside another piston moves to the inside of its associated cylinder bore 55.

In the presented embodiment, the two speed valve 120 is operated hydraulically. However, the two-speed valve 120 might also be operated mechanically or electro-mechanically. In other embodiments, as a person skilled in the relevant art is aware of, the two-speed-valve 120 could be a multiple speed valve 120 providing further positions, to vary the rotational speed and torque of the hydrostatic radial piston unit 1 in a greater range.

FIG. 3 shows a sectional view of the hydrostatic radial piston unit 1 according to the invention in a plane which is arranged orthogonal to the rotational axis 10. The stationary shaft 12 shown in the middle of the FIG. 3 is in torque proof connection with the cylinder block 50. Therefore, the cylinder block 50 is also stationary. The cylinder block 50 comprises radially arranged cylinder bores 55 which are equidistantly distributed on the circumferential surface of the cylinder block 50. Every cylinder bore 55 receives a working piston 60, such that the working piston 60 can slide in the cylinder bore 55 in the radial direction. The working pistons 60 comprise rollers 65 at the radially outward end. The rollers 65 are forced into contact with the cam-lobe surface 80 formed at the radial inside of the rotary casing 40, when pressure is supplied to the cylinder bores 55. The pressure creates a force on the working pistons 60 which is directed radially outwards. If the rotary casing is forced to rotate, the rollers 65 interact with the cam-lobe surface 80 depending on, whether the roller 65 is travelling from a lobe to a cam or vice versa. If the roller 65 travels from a lobe to cam, i.e. the shape of the cam-lobe surface is directed radially inwards, the roller 65 and the corresponding piston 60 are forced in the inward direction by the shape of the cam-lobe surface 80 and hydraulic fluid is drained from the associated cylinder bore 55. In the opposite case, i.e. if the roller travels from a cam to a lobe, which means that the shape of the cam-lobe surface 80 in this zone is directed radially outwards, the roller and the corresponding piston 60 are urged outwardly to follow the cam-lobe surface by the pressure inside the cylinder bore 55.

Figure 4:
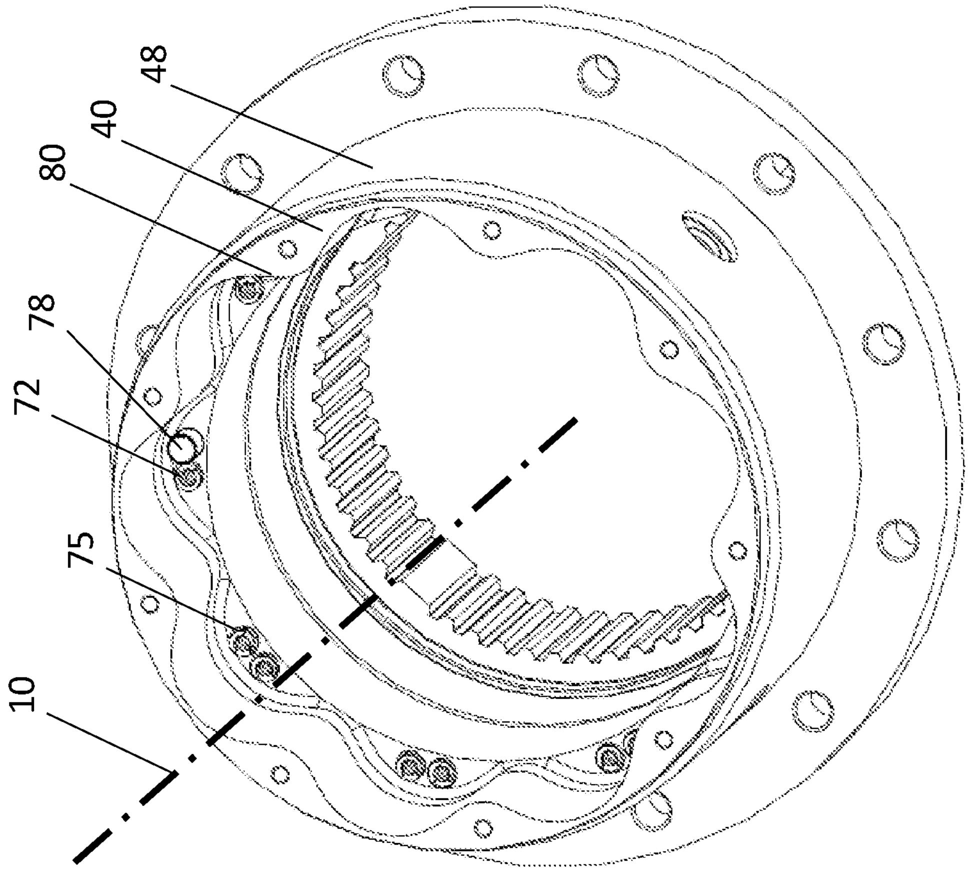
FIG. 4 shows an isometric view of a rotary casing of a hydrostatic radial piston unit according to the invention.

FIG. 4 shows an isometric view of a rotary casing 40 which is used in one embodiment of a hydrostatic radial piston unit 1 according to the invention. Apart from the already above mentioned features, FIG. 4 shows axially oriented holes 75 which are arranged radially inside of the cam-lobe surface 80 at a surface which is perpendicular to the rotational axis 10. The axially oriented holes 75 receive distributor springs 72 and/or distributor pistons that are capable of providing a pre-tensioning force onto an adjacently arranged rotary distributor 70. The disc shaped part 71 of the rotary distributor 70 and rotary casing 40 in combination with the axially oriented holes 75 and the accommodated distributor springs 72 can be coupled in a rotatable way by means of a synchronizing pin 78 arranged in one of the axially extending holes 75 of the rotary casing 40. In consequence, the rotary distributor 70 and the distributor springs 72 rotate with the same rotational velocity.

A person skilled in the relevant art detect from FIG. 4 in view of FIG. 1 or 2 that the axially oriented holes 75 can be moved to the distributor 70 also, to abut against the bottom surface of the associated lobe. Placing the distributor springs 72 in holes 75 in the distributor 70 fulfills the same function: to press the distributor 70 against the front face of the cylinder block 50.

In FIG. 4 a synchronizing pin 78 is shown also, arranged on a greater diameter as usual in the art. This lowers the shearing moment acting on the synchronizing pin 78. These shearing forces are generated in operation of the hydraulic motor by friction forces between the outer circumferential surfaces of the shaft 12 and inner circumferential surfaces of the distributor 70 sealing with the shaft 12 surfaces to from circular distribution channels (see also FIG. 1 or 2). Here, the synchronizing pin 78 is accommodated in an axial bore 75 in the front housing 40 and a corresponding hole in the distributor 70.

Figure 5:
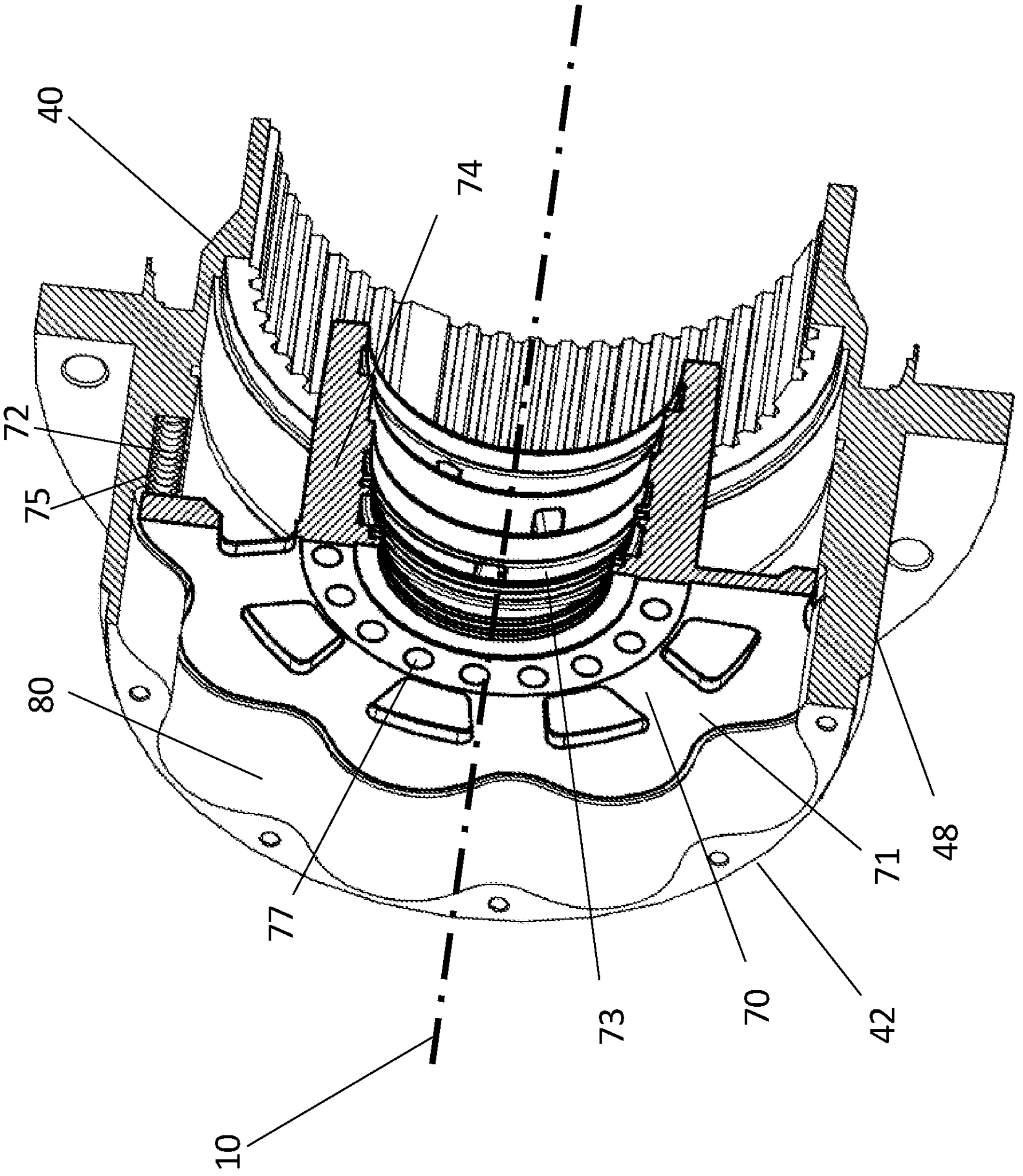
FIG. 5 shows an isometric sectional view of a rotary casing with a mounted distributor of a hydrostatic radial piston unit according to the invention.

FIG. 5 discloses a sectional view of a rotary casing 40, in which a rotary distributor 70 is arranged. The outer surface at the disc-shaped part of the distributor 70 is formed complementary to the cam-lobe surface 80, in order to support the functionality of a synchronizing pin 78 which is accommodated in the rotary casing 40. The synchronizing pin 78 ensures, that the rotational orientation of the distributor 70 is correct, when the distributor 70 is received in the rotary casing 40. Furthermore, the synchronizing pin 78 synchronizes the rotation of the distributor 70 with the rotation of the rotary casing 40. Additionally, it is shown, how the distributor springs 72 abut against the ground of the axially oriented holes 75 and thereby press the distributor 70 in the direction of the front end 42, i.e. towards the cylinder block 50 (not shown in FIG. 5). The rotary distributor 70 comprises a lightweight design, to reduce the rotational inertia of the assembly. For that, clearances are provided at the radially extending plate-like part 71 of the distributor 70 partially. Additionally the second internal grooves 73 which are formed at the radial inside of the distributor 70 are shown. The grooves 73 comprise an annular shape and are capable of guiding fluid to and from timing holes 77 which are arranged in the front face of the distributor 70.

Figure 6:
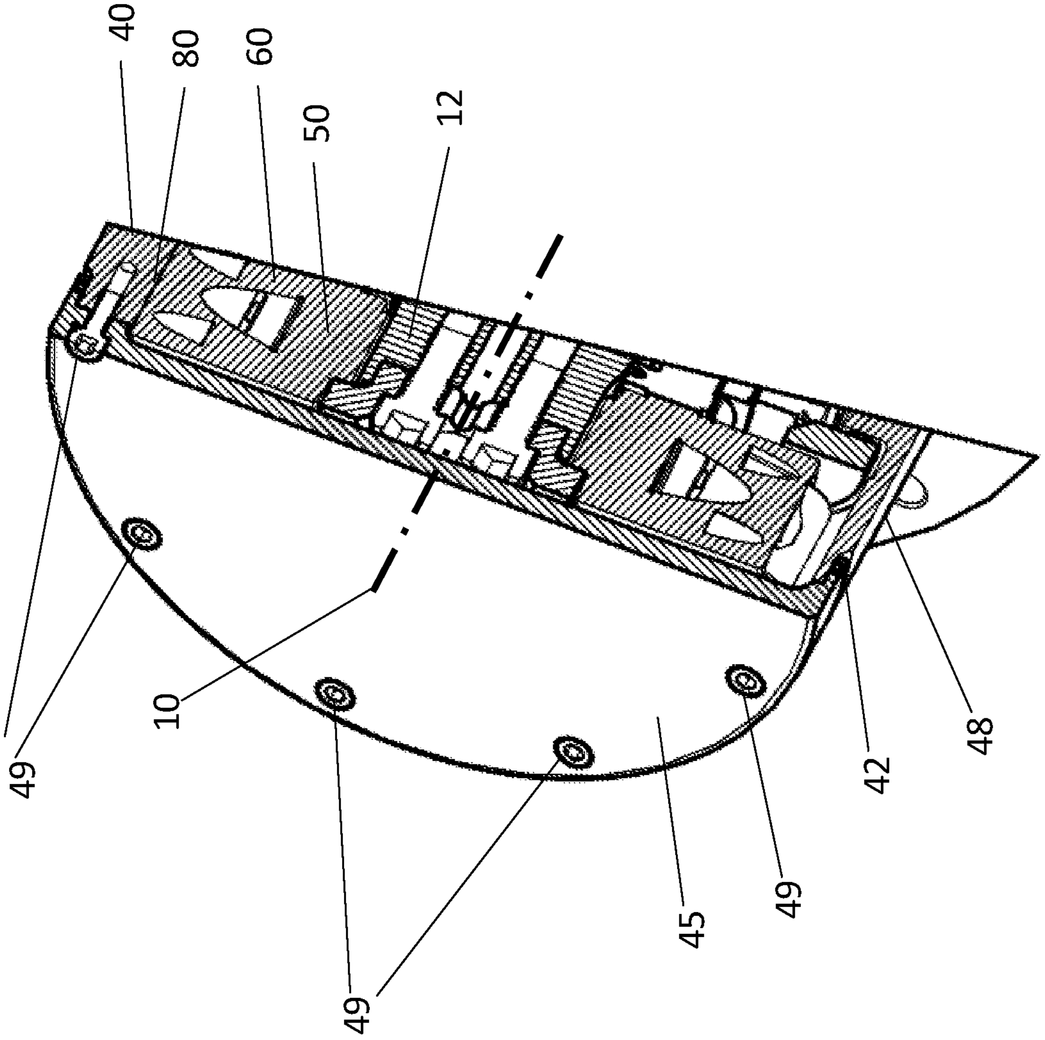
FIG. 6 shows a partial sectional view of the front end of a hydrostatic radial piston unit according to the invention.

FIG. 6 illustrates how the reinforcing front cover 45 is attached to the rotary casing 40 by means of screws which are equidistantly distributed along an imagined circular arc. The above explained combination of a collar in the front cover 45 and a step in the rotary casing 40 not only reinforces the cam-lobe surface 80, but also guarantees that the cover 45 is centered correctly in relation to the rotary casing 40. It will be appreciated that also other techniques to attach the cover to the rotary casing are within the knowledge of a person with relevant skills in the art.

From the above disclosure and accompanying Figures and claims, it will be appreciated that the hydrostatic radial piston unit 1 according to the invention offers many possibilities and advantages over the prior art.

What is claimed is:

1. A cam-lobe hydrostatic radial piston unit comprising:

a non-rotary, stationary shaft defining a rotational axis of the hydrostatic radial piston unit;

a non-rotary, stationary casing housing the shaft in a torque proof connection, and comprising an extension having a hollow cylindrical shape;

a cylinder block arranged stationary in torque-proof connection with the stationary shaft on a front end portion of the stationary shaft protruding from the stationary casing;

a rotary casing which is rotary around the rotational axis and surrounds the cylinder block at the protruding front end of the stationary shaft;

exactly two roller bearings which are arranged as a pair of roller bearings next to or in a close proximity to each other, wherein the pair of roller bearings rotationally supports the rotary casing against the stationary casing, and is disposed in the axial area adjacent to a radial outer side of the cylinder block facing toward the stationary casing, surrounds at least partially a hollow shaft part of a rotary distributor, and is arranged in an axial overlapping area in which the stationary casing and the rotary casing overlap, wherein the cylinder block and the stationary casing are separate elements, and wherein the pair of roller bearings contact a radial outer surface of the hollow cylindrical shape of the extension.

2. The hydrostatic radial piston unit according to claim 1, wherein the rotary distributor comprises a disc-shaped part being in torque proof connection with the rotary casing, wherein the pair of roller bearings is arranged radially outside of the hollow shaft part of the rotary distributor.

3. The hydrostatic radial piston unit according to claim 1, wherein the extension extends in axial direction beyond a sealing plane into the volume of the rotary casing and radially between the hollow shaft part of the rotary distributor and the rotary casing, wherein the extension is provided to accommodate the inner shells of the pair of roller bearings.

4. The hydrostatic radial piston unit according to claim 3, wherein the extension is provided as additional part and is attached to the stationary casing.

5. The hydrostatic radial piston unit according to claim 1, wherein the pair of roller bearings is positioned at the same axial position as a torque transmission device at an outer circumferential surface of the rotary casing.

6. The hydrostatic radial piston unit according to claim 1, comprising a stationary multiple-speed-control-valve switchable between a first position in which all cylinder bores of a stationary cylinder block can be supplied with hydraulic fluid under high pressure from a high pressure inlet of the hydrostatic radial piston unit and a second position in which only a portion of the cylinder bores is supplied with fluid under high pressure and pairs of cylinder bores are hydraulically short-circuited.

7. The hydrostatic radial piston unit according to claim 6, wherein the stationary multiple-speed-control-valve is arranged in an axial bore in the stationary shaft, wherein the axial bore is preferably coaxially arranged with the longitudinal axis.

8. The hydrostatic radial piston unit according to claim 6, wherein the multiple-speed-control-valve is a two-speed-control-valve or a three-speed-control-valve.

9. The hydrostatic radial piston unit according to claim 6, wherein the cylinder block comprises one or more rows of cylinder bores and radially reciprocating working pistons which are arranged in circumferential direction adjacent or staggered to each other and can interact with the cam-lobe surface.

10. The hydrostatic radial piston unit according to claim 1, comprising a park brake mechanism with brake discs located in the overlapping area between the stationary casing and the rotary casing and fixed alternatively to the stationary casing and the rotary casing, wherein the park brake mechanism comprises a blocking position in which the brake discs are pressed against each other and the rotary casing is fixed in relation to the stationary casing and an open position in which the brake discs are not pressed against each other and the rotary casing can rotate in relation to the stationary casing.

11. The hydrostatic radial piston unit according to claim 10, wherein the pre-tensioning force of a disc spring can be transmitted to the brake discs by means of a disc-shaped brake piston and by means of brake pins extending in an axial direction between the brake piston and the brake discs.

12. The hydrostatic radial piston unit according to claim 11, wherein the at least one brake pin comprises a portion with higher diameter at the end facing towards the brake piston.

13. The hydrostatic radial piston unit according to claim 12, wherein the park brake mechanism can be switched into its open position by supplying a hydraulic pressure to a pressure chamber sealed by a front end and a rear end of the at least one brake pin, such that the brake pin is forced towards the brake piston and forces the brake piston to compress the disc spring, therewith releasing the compressing force from the brake discs.

14. The hydrostatic radial piston unit according to claim 11, wherein the park brake mechanism can be switched into its open position by supplying a hydraulic pressure acting on a release surface of the disc-shaped brake piston which generates a counterforce to the pre-tensioning force of the disc spring.

15. The hydrostatic radial piston unit according to claim 1, wherein a cam lobe surface is integrally formed with the rotary casing.

16. The hydrostatic radial piston unit according to claim 1, wherein distributor springs are received in axially oriented holes in the rotary casing or in the disc-shaped part to urge the rotary distributor against a lateral surface of the cylinder block.

17. The hydrostatic radial piston unit according to claim 16, wherein the axially oriented holes receiving the distributor springs are arranged in the recesses of the cam-lobe-surface in the rotary casing or in an elevation formed in the disc-shaped part of the distributor.

18. The hydrostatic radial piston unit according to claim 1, wherein a second cylinder block, whose working pistons interact with the cam-lobe surface is arranged parallel to the first cylinder block on the stationary shaft.

19. The hydrostatic radial piston unit according to claim 18, wherein the number of cylinder bores and radially reciprocating working pistons of the second cylinder block differs from the number of cylinder bores and radially reciprocating working pistons of the first cylinder block, and a second circumferential cam lobe surface with which the working pistons of the second cylinder block can interact, is arranged in the front casing on its radial inner side.

20. The hydrostatic radial piston unit according to claim 19, wherein the second circumferential cam lobe surface is formed integrally with the front casing.

21. The hydrostatic radial piston unit according to claim 1, wherein a reinforcing front cover is attached to a front end of the rotary casing, which closes the rotary casing, wherein the front end and the reinforcing cover are designed such that the reinforcing cover is capable of absorbing forces acting on the rotary casing in radial direction.

22. The hydrostatic radial piston unit according to claim 21, wherein the reinforcing cover comprises a sleeve-like collar and the rotary casing comprises a complementary shoulder, or vice versa.

23. The hydrostatic radial piston unit according to claim 1, operated as a hydraulic motor driving a track drive or wheel of a working machine by means of the torque transmission device.

24. The hydrostatic radial piston unit according to claim 1, wherein the roller bearings are arranged in a vicinity of a rear end portion of the rotary casing and in a vicinity of a front end portion of the stationary casing.

* * * * *